United States Patent [19]

Mechling

[11] Patent Number: 5,009,601
[45] Date of Patent: Apr. 23, 1991

[54] METHOD FOR TEACHING GARMENT BUTTONING

[76] Inventor: Richard W. Mechling, 830 Vedado Way NE., Atlanta, Ga. 30308

[21] Appl. No.: 234,198

[22] Filed: Aug. 19, 1988

[51] Int. Cl.$^5$ .............................................. G09B 19/00
[52] U.S. Cl. .................................. 434/260; 24/90 TA
[58] Field of Search ............. 434/258, 260; 24/90 TA

[56] References Cited

U.S. PATENT DOCUMENTS

| | | | |
|---|---|---|---|
| 328,753 | 10/1885 | Beyerly | 24/90 TA |
| 2,585,689 | 2/1952 | Schafer | 24/90 TA |
| 3,816,200 | 6/1974 | McKenna | 24/90 TA |
| 3,997,982 | 12/1976 | Holland | 434/260 |

Primary Examiner—Edward M. Coven
Assistant Examiner—V. Szczepanik

[57] ABSTRACT

A method providing for independent garment buttoning by fine motor impaired individuals involving an elongated and pointed button. This button is made of malleable plastic and its shape and length are altered to match the buttoning skill of the subject.

2 Claims, 1 Drawing Sheet

METHOD FOR TEACHING GARMENT BUTTONING

FIELD OF THE INVENTION

The present invention relates generally to garment closures of the button type. The invention relates more specifically to a button having an increased length with a point at the end of that length, and to a method for adjusting the button's length and shape in accordance with a subject's buttoning skill.

DESCRIPTION OF THE PRIOR ART

The fine motor coordination required for use of traditional garment buttons is normally mastered before the elementary school years, and therefore such coordination rarely provides a barrier to independent dressing. However, to many individuals with coordination deficits due to central nervous system damage or due to joint stiffening arthritis, the inability to use shirt and pants buttons prevents their independent use of many items of standard clothing. This is readily apparent upon inspection of special education classrooms, where it is common for children to devote regular practice over a period of years in the failed attempt to master conventional buttoning.

The above mentioned problem has been recognized for many years, and several alternative devices have been employed as improvements. One such device is the button-hook, which requires one hand to slide a wire loop through the button hole and encircle the button, before being pulled back through the button hole with the button in tow. The button hook can work quite well when the one hand used has normal coordination. Unfortunately, the disabled individual rarely has a hand with normal coordination.

A second device which is currently in wide use is the buttoning vest. This is a cloth vest with very large round buttons and with very large button holes. The large buttons and button holes are meant to present easy practice for beginners. Buttoning vests fail to meet the needs of many subjects, because it is often the case that even the large buttons are too difficult for the subject to manipulate, and because they do not encourage the correct hand and finger coordination needed to move on to the more difficult small buttons. More specifically, the large button hole does not allow the subject to place the fleshy surface of the thumb against the button hole. Should the subject attempt to place their thumb against the large button hole, the thumb will protrude through the hole thus blocking insertion of the button. Instead the subject often chooses to grasp the edge of the material beside the button hole between their thumb and index finger and pull on the material so as to open the button hole before inserting the button. In this case the subject is not learning to feel the leading edge of the button contact their thumb as it moves into the button hole. Such faulty technique handicaps the subject as they move on to normal buttons.

Another approach that is widely employed in response to buttoning difficulties is to avoid the task totally and sew velcro on all normally buttoning clothing. Such velcro use points out the need for a new approach that allows independence in buttoning for many motor impaired subjects.

SUMMARY OF THE INVENTION

The present invention provides a method of use which satisfies the aforementioned needs. The invention provides an improved button which can be used to button garments by many people whose fine motor paralysis or joint deterioration leaves them with little dexterity more advanced than the ability to oppose the tips of the index fingers and thumbs. In addition, the present invention allows a method of adapting the button to encourage development of more advanced buttoning skills.

In the preferred embodiment a button is cut or shaped from plastic which is malleable when heated such as plastic used to make splints or braces in hospitals. Whereas the standard button is most often a round disc, this preferred embodiment includes a flat disc that is instead cut or formed so as to have an elongated side with a point on that end. The end of the button opposite the pointed end is rounded thus causing the button t look similar in shape to an arrowhead. The width of the button is chosen to match the length of the button holes in the garment to which it will be attached. The rounded side of this elongated button has its edges raised and flaired.

This preferred embodiment overcomes many of the shortcomings of the standard garment button with regards to use by fine motor impaired individuals. When the elongated end of the button is placed through the buttonhole its increased length makes it simpler to grasp than the relatively smaller side of a standard button. The sharp pointed tip of the elongated side provides an intense and easily discriminable tactile sensation against the thumb of the neurologically impaired subject who has difficulty discriminating the comparably duller sensation provided by the standard rounded button. Likewise, the raising and flairing of the edges of the rounded side of the elongated button also provide a comparably sharp and easily discriminable tactile sensation to the subject as they grasp that edge to initiate the buttoning task.

The ease with which the preferred embodiment can be reshaped allows the teacher of the buttoning task to make the elongated button have sufficient elongation, pointedness, and flairing to match the buttoning skill of the subject. Should the subject have no difficulty buttoning his or her garment with a relatively long button, the teacher may choose to cut a small length from the pointed end of the elongated button and progress the subject onto a slightly more difficult task. If continued buttoning over time results in mastery of this second more difficult task, the button could again be modified in pointedness, elongation, or edge flairing to be more difficult. The above process can be continued until the subject has sufficient coordination to reasonably attempt using standard garment buttons.

Accordingly, it is an object of the present invention to provide an improved garment button for allowing fine motor impaired subjects to independently button their garments.

It is another object of the present invention to provide a method of changing a garment button's shape so that it can be adapted to match changes in the buttoning skill of the subject.

It is another object of the present invention to provide a button with an elongated end that can be easily grasped by the motor impaired subject.

It is another object of the present invention to provide a button with an end which is pointed, and therefore easily discriminable to the tactile senses.

It is another object of the present invention to provide a button with edges which are raised and flaired, and therefore easily discriminable to the tactile senses.

DETAILED DESCRIPTION OF THE PREFERRED EMBODIMENT

Figure 1:
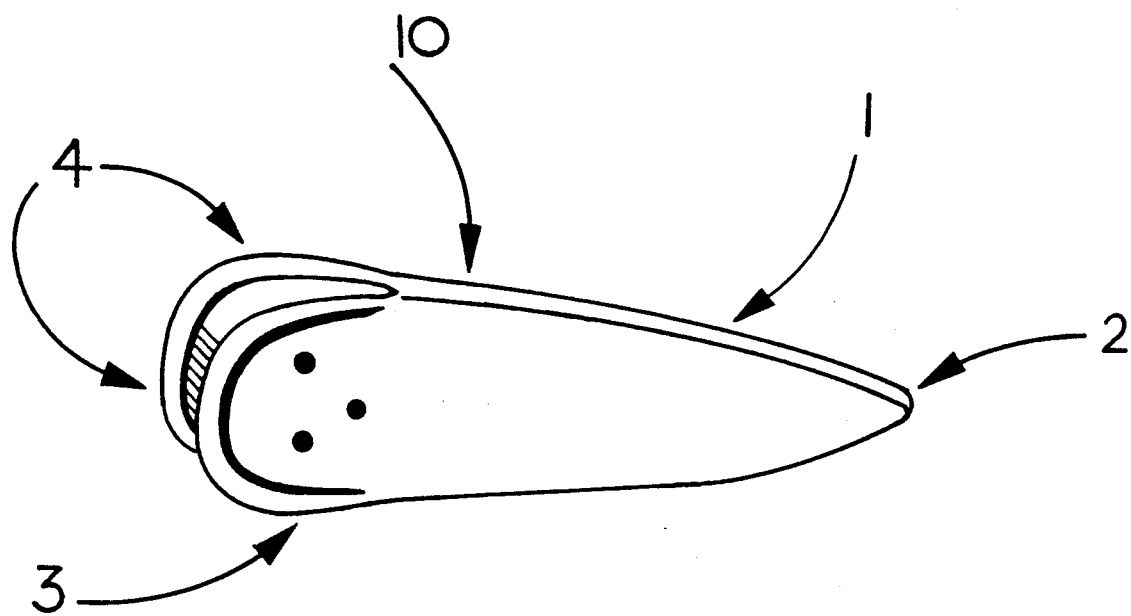
FIG. 1 is a perspective view of a preferred embodiment of the present invention.
Figure 2:
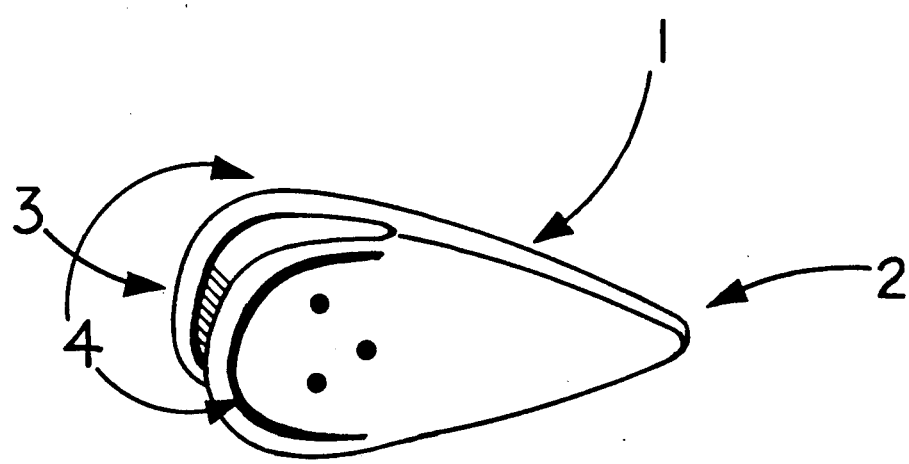
FIG. 2 is a perspective view of a second preferred embodiment of the present invention.

Referring now to the drawings, in which like numbers indicate elements throughout the two views, FIG. 1 and FIG. 2 show preferred embodiments of an elongated button constructed in accordance with the present invention.

The elongated buttons 10 comprise a flattened disc made from plastic which becomes malleable upon being heated. This flattened disc 10 has an elongated side 1 with a point 2 at the end of that side. The rounded side 3 of the button is opposite the elongated side 1. Rounded side 3 has raised and flaired edges 4.

It will be understood that the elongated side 1 is relatively easier to grasp when it is placed through a button hole than would be the relatively shorter side of the traditionally rounded button. Accordingly, the length of the elongated side 1 may be adjusted to match the degree of dexterity of the motor impaired subject. FIG. 2 shows a shorter elongated side 1 than does FIG. 1 and is therefore a relatively more difficult button requiring more advanced buttoning skill.

It will be understood that the point 2 on the elongated side 1 in both FIG. 1 and FIG. 2 are relatively easier than is a rounded button edge for the sensory impaired subject to discriminate as it moves through the button hole.

It will be understood that the raised and flaired edges 4 on the rounded side 3 in both FIG. 1 and FIG. 2 are relatively easier than are the non-raised and non-flaired edges of a standard button for the sensory impaired subject to discriminate as they grasp the elongated button.

The simplest use of the elongated button 10 includes forming an elongated side 1 with a length such that the subject is successful in independent buttoning while attending carefully to the task on the majority of their attempts. As the subject becomes more skillful, and consistently completes the buttoning task within seconds, the elongation 1 and/or the raised and flaired edges 4 can be slightly reduced in size after heating the plastic. The newer and slightly more difficult elongated button will then again require careful attention for successful subject use and will therefore lead to increased buttoning skill.

The preferred embodiment of the present invention has been disclosed by way of example, and it will be understood that other modifications may occur to those skilled in the art without departing from the scope and the spirit of the appended claims.

I claim:

1. A method of teaching the skill of garment buttoning to a subject, comprising the steps of:
    (a) providing a button with an elongated and pointed side to allow increased sensation to the thumb and index finger of the subject;
    (b) providing said button with raised and flaired edges on a side opposite said elongated and pointed side to allow increased sensation to the thumb and index finger of the subject;
    (c) selecting an initial predetermined length of said elongated and pointed side of said button according to the subject's level of buttoning skill;
    (d) allowing the subject to attempt to perform the buttoning task using said button which has said initial predetermined length to said elongated and pointed side;
    (e) decreasing the length of said initial predetermined length to said elongated and pointed side for a subject demonstrating improved or progressive buttoning skills.

2. A method of teaching the skill of garment buttoning to a subject, comprising the steps of:
    (a) providing a button with an elongated and pointed side to allow increased sensation to the thumb and index finger of the subject;
    (b) providing said button with raised and flaired edges on a side opposite said elongated and pointed side to allow increased sensation to the thumb and index finger of the subject;
    (c) selecting an initial predetermined length of said elongated and pointed side of said button according to the subject's level of buttoning skill;
    (d) allowing the subject to attempt to perform the buttoning task using said button which has said initial predetermined length to said elongated and pointed side;
    (e) increasing the length of said initial predetermined length to said elongated and pointed side for a subject demonstrating decreased or regressive buttoning skills.

* * * * *